United States Patent
Gangwar et al.

(10) Patent No.: US 10,473,678 B2
(45) Date of Patent: Nov. 12, 2019

(54) DETECTION AND WIRELESS TRANSMISSION OF WHEEL ROTATION DIRECTION

(71) Applicant: Ford Global Technologies, LLC, Dearborn, MI (US)

(72) Inventors: Hans Gangwar, Livonia, MI (US); William Falconer, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/131,606

(22) Filed: Apr. 18, 2016

(65) Prior Publication Data

US 2017/0299621 A1    Oct. 19, 2017

(51) Int. Cl.
| | |
|---|---|
| G01P 3/44 | (2006.01) |
| G01D 5/249 | (2006.01) |
| G01D 5/30 | (2006.01) |
| G01P 3/36 | (2006.01) |
| G07C 5/02 | (2006.01) |
| G01D 5/246 | (2006.01) |

(52) U.S. Cl.
CPC .............. *G01P 3/44* (2013.01); *G01D 5/2497* (2013.01); *G01D 5/30* (2013.01); *G01P 3/36* (2013.01); *G07C 5/02* (2013.01); *G01D 5/246* (2013.01)

(58) Field of Classification Search
CPC .................................... G01B 7/30; G01P 3/44
USPC ....................................................... 324/207.25
See application file for complete search history.

(56) References Cited

U.S. PATENT DOCUMENTS

| | | | |
|---|---|---|---|
| 5,977,765 A * | 11/1999 | Gibson | F02D 41/0097 324/165 |
| 7,021,127 B2 | 4/2006 | Schroeder et al. | |
| 7,123,998 B2 * | 10/2006 | Bates | B60T 1/06 701/1 |
| 8,253,413 B2 * | 8/2012 | Hammerschmidt | H03M 1/28 324/173 |
| 8,289,144 B2 | 10/2012 | Zhu et al. | |
| 2011/0018526 A1 | 1/2011 | Windmueller et al. | |
| 2011/0068912 A1 | 3/2011 | Tollkuehn et al. | |
| 2012/0293115 A1 * | 11/2012 | Ramsesh | G01D 5/2013 320/108 |

(Continued)

FOREIGN PATENT DOCUMENTS

| | | | |
|---|---|---|---|
| DE | 102008008237 | 8/2009 | |
| DE | 102010041444 A1 * | 3/2012 | ............ F02D 41/009 |
| WO | 2010105963 | 9/2010 | |

OTHER PUBLICATIONS

Translation of DE102010041444A1, Mar. 29, 2012.*

(Continued)

*Primary Examiner* — Reena Aurora
(74) *Attorney, Agent, or Firm* — Ray Coppiellie; Hanley, Flight & Zimmerman, LLC

(57) ABSTRACT

Wireless transmission of wheel rotation direction is disclosed. A disclosed apparatus includes a tone ring exhibiting a rotational asymmetry and a detector to measure a rotational direction of a wheel of a vehicle based on the rotational asymmetry and to measure a rotational speed of the wheel, where the detector or the tone ring is operatively coupled to the wheel. The disclosed apparatus also includes a wireless transmitter to transmit the rotational direction and the rotational speed to a receiver proximate or within an engine compartment of the vehicle.

12 Claims, 9 Drawing Sheets

(56) References Cited

U.S. PATENT DOCUMENTS

| | | | |
|---|---|---|---|
| 2013/0038319 A1* | 2/2013 | Gayney | G01D 5/147 |
| | | | 324/166 |
| 2014/0197822 A1* | 7/2014 | Ritter | G01D 5/16 |
| | | | 324/207.21 |
| 2017/0276570 A9* | 9/2017 | White | B60B 7/0013 |

OTHER PUBLICATIONS

Benzworld, "ABS Tone Ring?? What's that?", published on May 9, 2008, retrieved on Apr. 18, 2016, [http://www.benzworld.org/forums/r170-slk-class/1376710-abs-tone-ring-whats.html], 8 pages.

* cited by examiner

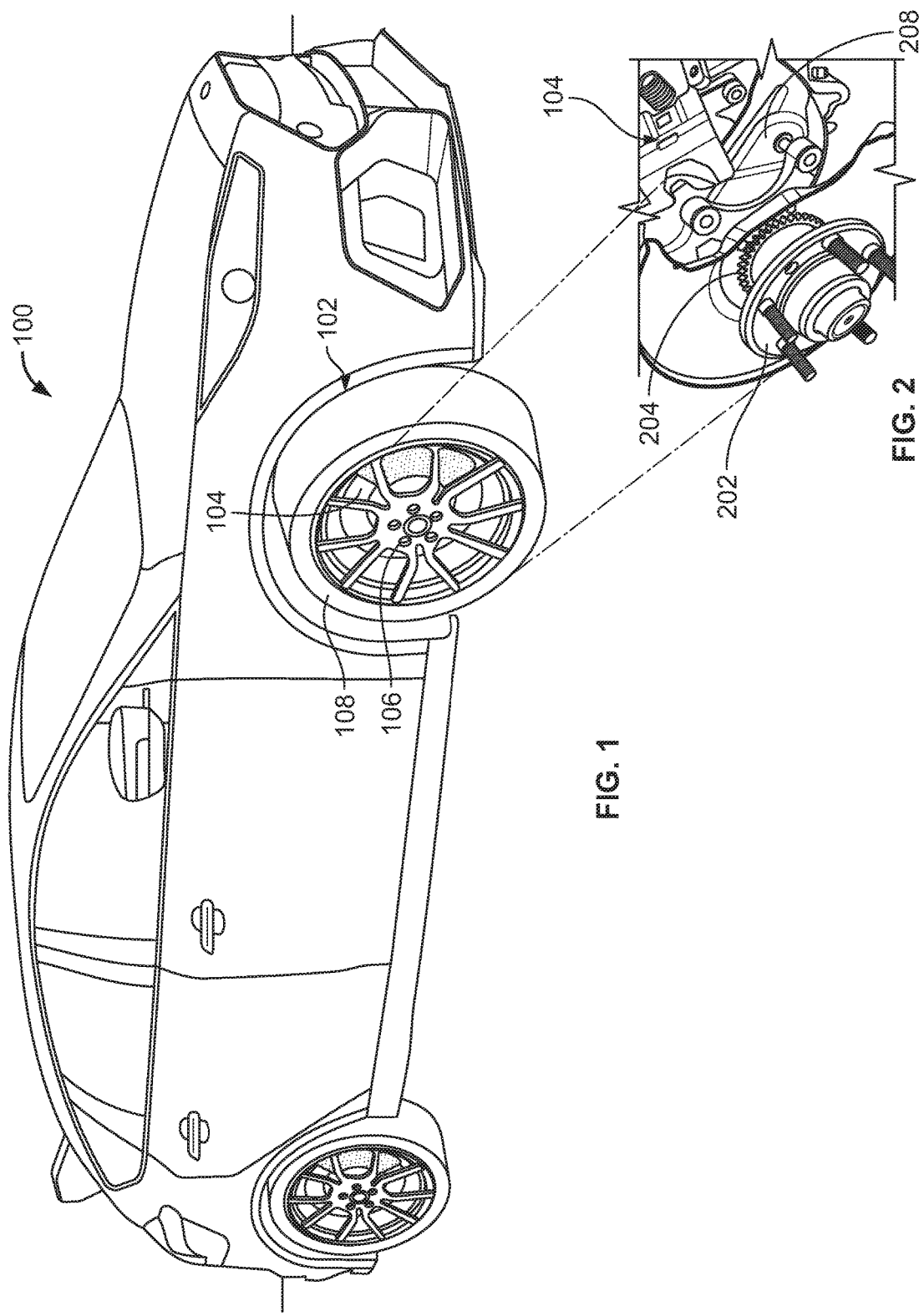

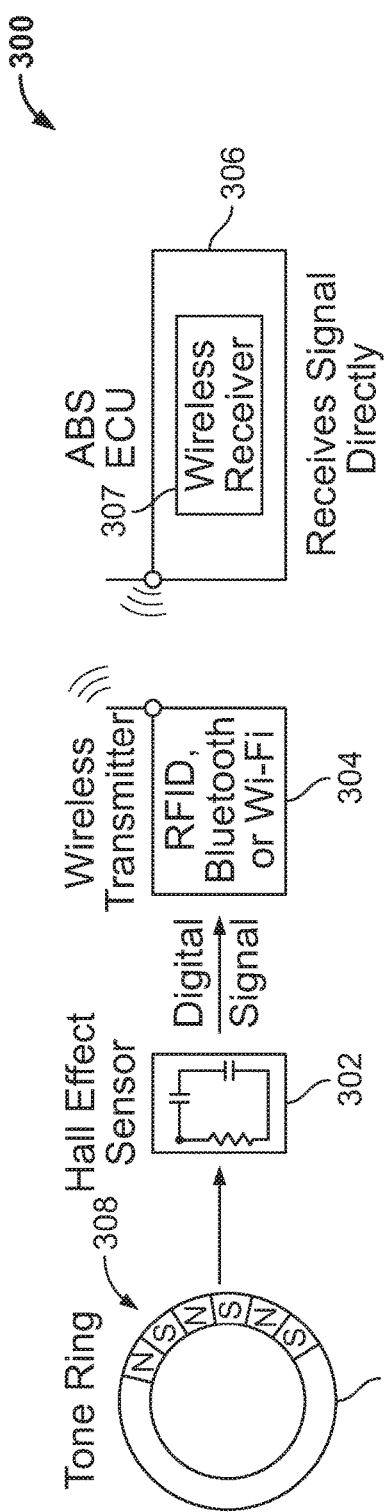
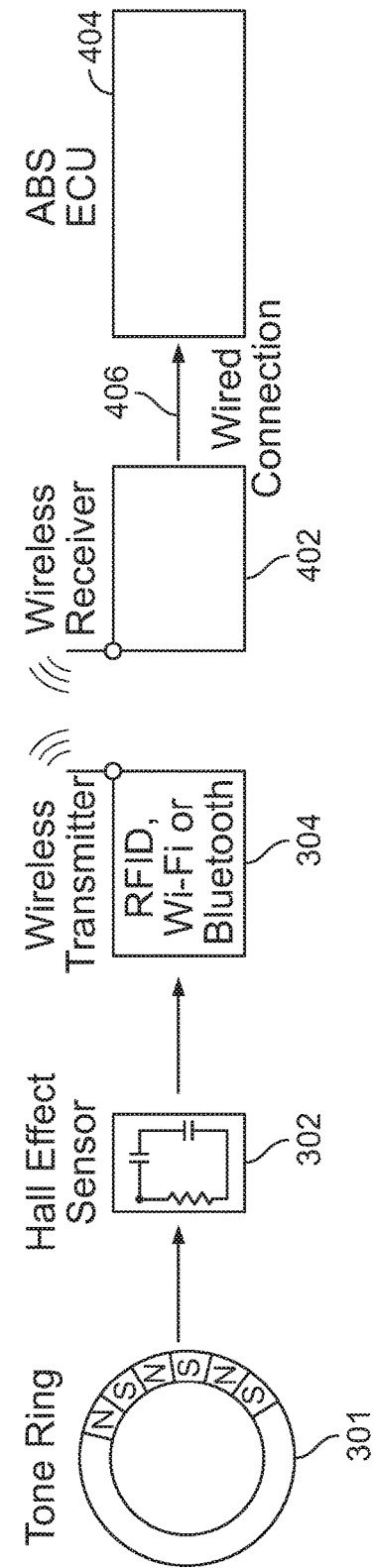
FIG. 3
FIG. 4

DETECTION AND WIRELESS TRANSMISSION OF WHEEL ROTATION DIRECTION

FIELD OF THE DISCLOSURE

This disclosure relates generally to vehicles and, more particularly, to detection and wireless transmission of wheel rotation direction.

BACKGROUND

Wheel speed detection is typically used in brake control systems such as anti-lock braking (ABS) systems in vehicles. In particular, wheel speed may be measured to determine whether slippage is occurring at one or more tires of a vehicle and/or whether the vehicle is skidding. As a result, a typical ABS system may control brakes (e.g., modulate one or more of the brakes) based on the slippage, for example.

Typically, cabling including wires extend between wheel sensor systems and an electronic control unit (ECU) that is located in an engine compartment of the vehicle to transmit wheel speed measurements. Such use of cabling is prone to damage from external elements to which a wheel well is exposed when the vehicle is driven. Such cabling may require sealing components and/or design complexities to avoid damage to the cabling and/or associated connectors. Some known wheel speed detection systems utilize wireless transmission of a detected wheel speed. However, these systems do not detect or convey a direction of rotation of a wheel.

SUMMARY

An example apparatus includes a tone ring exhibiting a rotational asymmetry, and a detector to determine a rotational direction of a wheel of a vehicle based on the rotational asymmetry and to measure a rotational speed of the wheel, where the detector or the tone ring is operatively coupled to the wheel. The example apparatus also includes a wireless transmitter to transmit the rotational direction and the rotational speed to a receiver proximate or within an engine compartment of the vehicle.

An example method includes determining wheel rotation information including speed and rotation direction of a wheel of a vehicle based on an asymmetry of a tone ring coupled to or proximate the wheel, and wirelessly transmitting the wheel rotation information from a transmitter proximate the wheel to a receiver disposed within or proximate an engine compartment of the vehicle.

An example apparatus includes a transmitter proximate a wheel of a vehicle, where the transmitter is to measure or receive wheel rotation information, and where the wheel rotation information indicates speed and rotation direction of the wheel. The example apparatus also includes a receiver disposed within an engine compartment of the vehicle to wirelessly receive the wheel rotation information.

BRIEF DESCRIPTION OF THE DRAWINGS

FIG. 1 is an example vehicle in which the examples disclosed herein may be implemented.

FIG. 2 is an enlarged view of an example brake assembly of the example vehicle of FIG. 1.

FIG. 3 is a schematic overview of an example wheel detection system in accordance with the teachings of this disclosure.

FIG. 4 is a schematic overview another example wheel detection system.

Figure 5B:
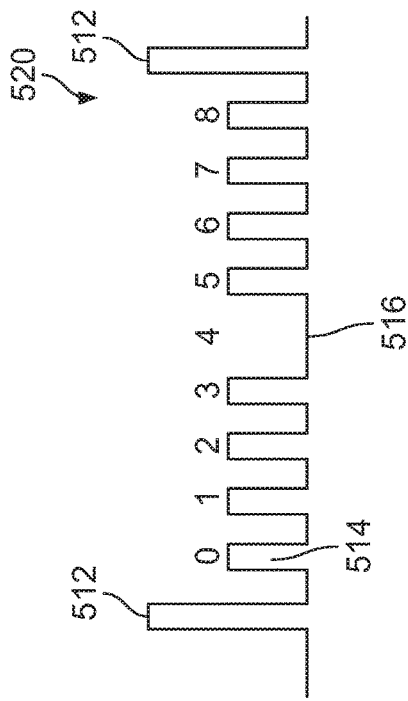
FIG. 5B illustrates an example signal that may be produced by the example tone ring shown in FIGS. 3, 4 and 5A for a first direction of rotation.

The figures are not to scale. Further, wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Detection and wireless transmission of wheel rotation direction is disclosed herein. Known wheel speed detection systems of vehicles often employ cabling from a wheel speed sensor located proximate a wheel of a vehicle to a control unit, which is typically located in an engine compartment of the vehicle. Such cabling can be susceptible to damage (e.g. moisture, contaminants, debris, etc.). Some known wireless speed detection systems indicate wheel speed, but do not indicate wheel rotation direction.

The examples disclosed herein enable detection of a wheel rotation direction (e.g., a wheel spin direction) by utilizing an asymmetry about a rotational axis of a tone ring that is operatively coupled to the wheel. For example, a Hall Effect sensor may be used to detect a rotational direction of the tone ring based on a waveform (e.g., a pulse waveform) detected via rotation of the tone ring. In particular, a property and/or a characteristic of this waveform may vary with different rotational directions to indicate a direction of rotation of the tone ring and, thus, the wheel to which the tone ring is coupled. The examples disclosed herein may be used by an electronic control unit for control of a braking/skid control system and/or as part of an automated system (e.g., an automated parking system, etc.).

In some examples, an asymmetry of one or more teeth of a tone ring is used to determine a direction of rotation. In some examples, the asymmetry is defined based on varying relative sizes (e.g., lengths, circumferential lengths) of magnet pairs of a tone ring along the circumference of the tone ring. In other examples, the asymmetry is based on the circumference of a tone ring being divided into alternating segments of relatively low and high reflectance that interact with an optical sensor.

FIG. 1 is an example vehicle 100 in which the examples disclosed herein may be implemented. In the illustrated example of FIG. 1, the vehicle 100 includes a wheel assembly 102, which includes a brake assembly 104, a wheel 106 and a tire 108. In this example, the vehicle 100 includes multiple wheel assemblies 102. However, for conciseness, the examples disclosed herein will be described in the context of a single wheel/brake assembly.

In operation, the brake assembly 104 is used to reduce a rate of rotation of the wheel assembly 102 and, in turn, slow down (e.g., reduce a rotational speed) and/or direct/maneuver the vehicle 100. In this example, the brake assembly 104 is also used to determine a wheel speed (e.g., a rotational speed) of the wheel 106 to determine whether the tire 108 is slipping relative to other tires of the vehicle 100.

FIG. 2 is an enlarged view of the example brake assembly 104 of FIG. 1. The example brake assembly 104 includes a wheel attachment support (e.g., an axle) 202, a tone ring 204, brake pads (removed for clarity) and a brake caliper 208. In this example, the brake assembly 104 is used for both braking functionality as well as wheel speed detection.

To detect wheel speed, the tone ring 204 of the illustrated example is coupled (e.g., operatively coupled) to the wheel 106 and has teeth on a peripheral edge (e.g., an outer circumference) of the tone ring 204. In particular, the teeth and/or air gaps defined by the teeth are detected by a sensor and used to create a pulse train waveform that is used to determine and/or indicate wheel speed as the tone ring 204 rotates with the wheel assembly 102.

FIG. 3 is a schematic overview of an example wheel detection system 300 in accordance with the teachings of this disclosure. The example wheel detection system 300 includes a tone ring 301, a rotation sensor (e.g., a Hall Effect sensor, a detector, a magnetic field sensor) 302, a wireless transmitter 304 and a control unit (e.g., an ABS electronic control unit) 306, which is unitary with and/or includes a wireless receiver 307 in this example. The transmitter 304 and the control unit 306 may use any appropriate communication protocol and/or hardware platform including, but not limited to, a radio frequency identification device (RFID) (e.g., active RFID, passive RFID, semi-passive RFID, etc.), Bluetooth, Wi-Fi, etc. In some examples, the transmitter 304 is integral with the rotation sensor 302.

In operation, the rotation sensor 302 determines a rotational speed of a wheel based on rotation of the tone ring 301. In particular, the rotation sensor 302 measures a detected rate of change of polarity from an annular pattern/arrangement of magnets 308 that is used to determine a rotational speed of the tone ring 301 and a respective wheel to which the tone ring 301 is coupled. In this example, the rotation sensor 302 is a Hall Effect sensor that generates a pulse waveform/pattern based on rotation of the tone ring 301. In some examples, the rotation sensor 302 is mounted to a wheel well or chassis control arms. While the tone ring 301 of the illustrated example rotates relative to the rotation sensor 302, in other examples, the rotation sensor 302 rotates along with the respective wheel. In particular, the tone ring 301 remains stationary relative to the rotation sensor 302 (e.g., the rotation sensor 302 is coupled to the respective wheel instead of the tone ring 301 being coupled to the respective wheel).

To determine a rotation direction of the wheel, which is coupled to the tone ring 301, the tone ring 301 exhibits asymmetry and/or asymmetric features about its rotational axis (e.g., non-axisymmetric properties). In particular, the geometry (e.g., a shape of one or more teeth of the tone ring 301) and/or an annular pattern/arrangement of the magnets 308 along a peripheral edge 309 of the tone ring 301 in a general ring shape may be configured to generate a waveform detected at the rotation sensor 302 that differs based on different rotational directions of the tone ring 301. The detection of wheel rotation direction using magnets is described in greater detail below in connection with FIGS. 5A-5C. While some of the examples shown herein include a pattern of teeth that define an asymmetry, any appropriate type of asymmetry may be used, including the examples described below in connection with FIGS. 6-8.

FIG. 4 is a schematic overview of another example wheel detection system 400. The example wheel detection system 400 is similar to the example wheel detection system 300 of FIG. 3, but instead of the control unit 306 with an integrated wireless receiver 307, the wheel detection system 400 includes a separate wireless receiver 402, an electronic control unit 404, which does not include a wireless receiver, and a wired connection 406 to communicatively couple the wireless receiver 402 to the electronic control unit 404.

In this example, the sensor 302 detects wheel rotation information including a wheel rotational speed and wheel spin direction via detection of the magnets 308 of the tone ring 301. The wheel rotation information is transmitted to the wireless receiver 402 via the wireless transmitter 304. In turn, the wireless receiver 402 communicates the wheel rotation information to the electronic control unit 404 via the wired connection 406. Because the electronic control unit 404 does not include a wireless receiver and/or transceiver, the wheel detection system 400 may be used to replace an existing wired wheel detection system, thereby removing an existing wired connection from the rotation sensor 302 to the electronic control unit 404. This removal of the wired connection can reduce susceptibility to damage and/or eliminate a need for sealing components, which can fail or wear with time, to reduce exposure to external elements encountered by a wheel assembly in a wheel well (e.g., the outdoor elements, water, external debris, etc.).

Figure 5C:
FIG. 5C illustrates another example signal that may be produced by the example tone ring shown in FIGS. 3, 4 and 5A for a second direction of rotation.
Figure 5A:
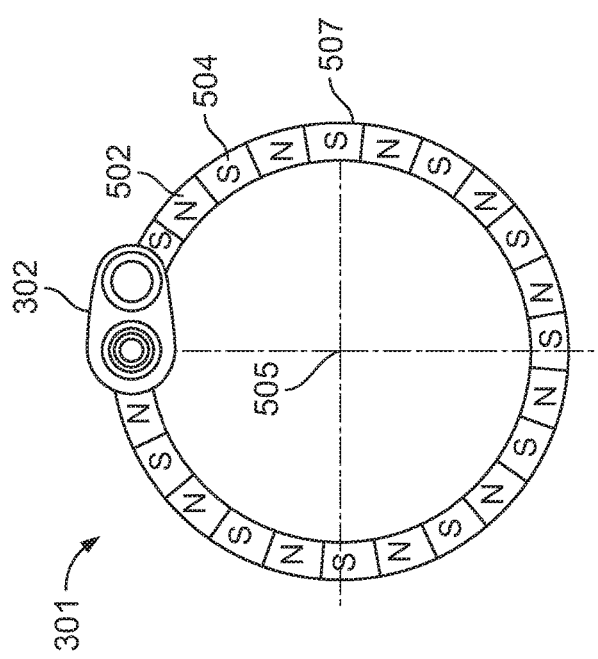
FIG. 5A illustrates an example tone ring shown in FIGS. 3 and 4.

FIG. 5A illustrates the example tone ring 301 shown in FIGS. 3 and 4. The tone ring 301 of the illustrated example includes magnets 502 directed in a North polarity direction relative to the rotation sensor 302 and magnets 504 directed in a South polarity direction relative to the rotation sensor 302, both of which are arranged along a peripheral edge 507 of the tone ring 301 as repeating pairs about a rotational axis 505 of the tone ring 301. In some examples, there are 44 pairs. However, any appropriate number of pairs may be used based on application, wheel design and/or vehicle design, etc. In the view of FIG. 5A, the rotation sensor 302 remains fixed relative to the tone ring 301 as the tone ring 301 rotates, thereby allowing the rotation sensor 302 to detect movement of the tone ring 301.

In this example, the tone ring 301 includes at least one asymmetry exhibited at its peripheral edge 507 to enable an encoder of the rotation sensor 302 to generate an output signal that indicates a rotational direction of the tone ring 301 and, thus, the respective wheel attached thereto. For example, the tone ring 301 may exhibit a geometric asymmetry of teeth (e.g., teeth defined by positioning and/or shapes of the magnets 502) disposed on the peripheral edge 507. In such examples, the geometric asymmetry defines output waveforms that vary in response to different rotational directions. In other examples, an asymmetry is defined by an arrangement of the magnets 502 (e.g., defined by positioning, dimensions and/or numbering of the magnets 502 along the peripheral edge 507).

To further illustrate determination of a rotational direction of a tone ring rotating along with a wheel, an output waveform plot 510 of FIG. 5B indicates an example signal that may be generated/produced by the rotation sensor 302 based on rotation of the tone ring 301 in a first direction (e.g., the first direction). In this example, the plot 510 includes markers 512, which may be included to define and/or encompass a rotational cycle and/or a portion of a full rotational cycle, and pulses 514 produced by respective magnet pairs as the tone ring 301 rotates. The plot 510 also includes a pulse 516 representing the rotational direction of the tone ring 301. Based on the rotation direction in the example of FIG. 5A, the pulse 516 is high, which indicates a specific direction of rotation of the tone ring 301.

Conversely, FIG. 5C illustrates a plot 520, which illustrates the signal generated by the tone ring 301 when rotating in a second direction that is opposite the first direction. In this example, the rotational direction the pulse 516 is low, which is based on the opposite rotation of the tone ring 301 from the direction shown in FIG. 5B (e.g., the second direction). As can be seen in both FIGS. 5B and 5C, in some examples, rotational speed and wheel rotation direction are multiplexed within a common signal.

Figure 5D:
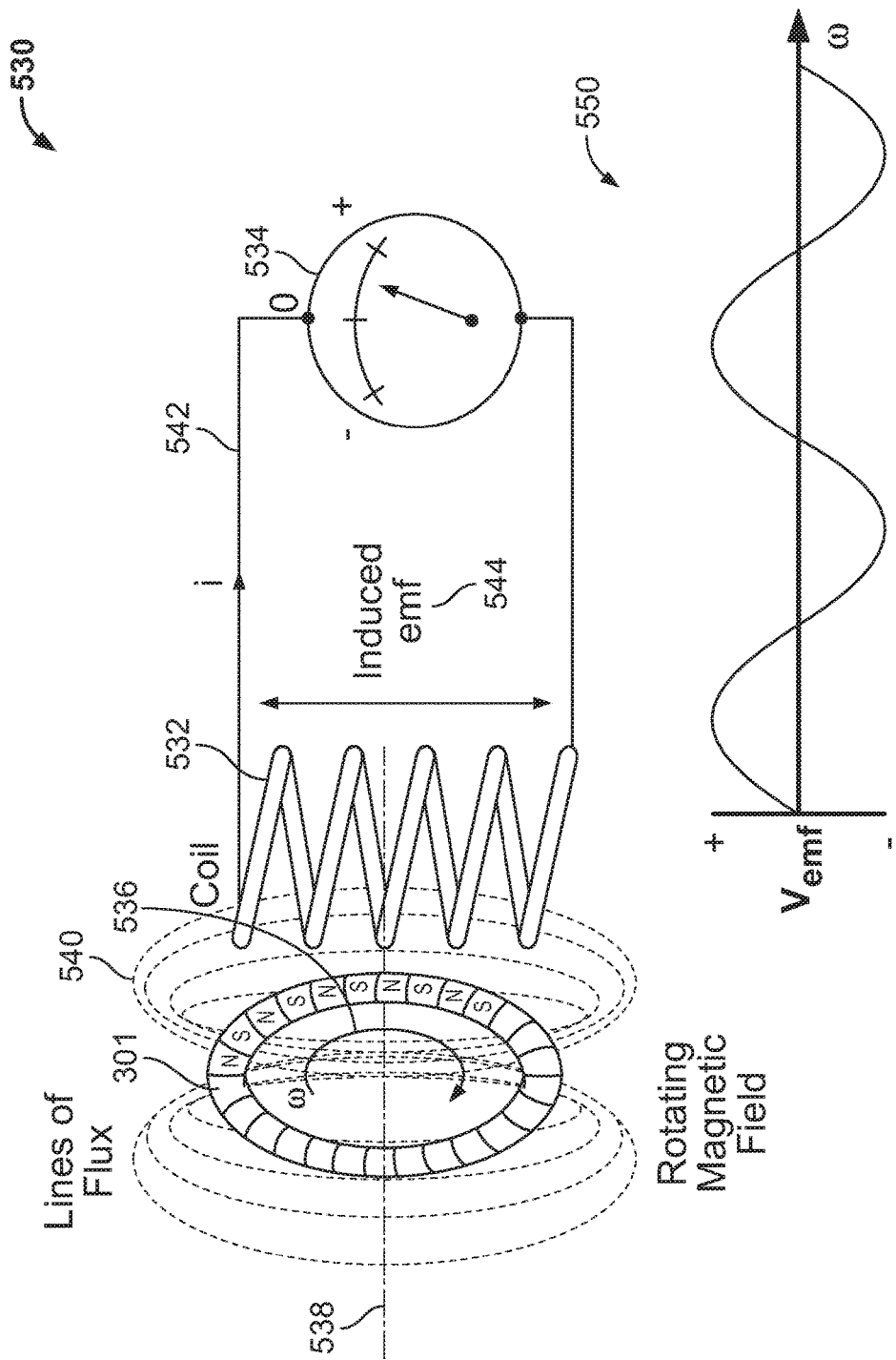
FIG. 5D illustrates an example power generation system that may be implemented in conjunction with the example tone ring shown in FIGS. 3, 4 and 5A.

FIG. 5D illustrates an example power generation system (e.g., a sensor power generation system and/or a transmitter power generation system, etc.) 530 that may be implemented in conjunction with the example tone ring shown in FIGS. 3, 4 and 5A. As can be seen in the illustrated example of FIG. 5D, the power generation system 530 includes the tone ring 301, a coil 532 and a voltage measurement device 534.

To generate a voltage that may be used to power an encoder and/or sensor, for example, as the tone ring 301 of the illustrated example rotates in a direction generally indicated by an arrow 536 along an axis of rotation 538, a magnetic field, which is indicated by flux lines 540 in this example, is generated, thereby inducing an electromagnetic field (e.g., a rotating electromagnetic field) 544 at the coil 532. In turn, a current 542 is generated which, in turn, causes a voltage and/or voltage signal to be read at the voltage measurement device 534. As a result, one or more components of the wheel detection system 300 may be powered and/or partially powered by the generated current 542 resulting from the electromagnetic field 544. In this example, a plot 550 illustrates an example voltage waveform that may be generated by the example power generation system 530.

Figure 7:
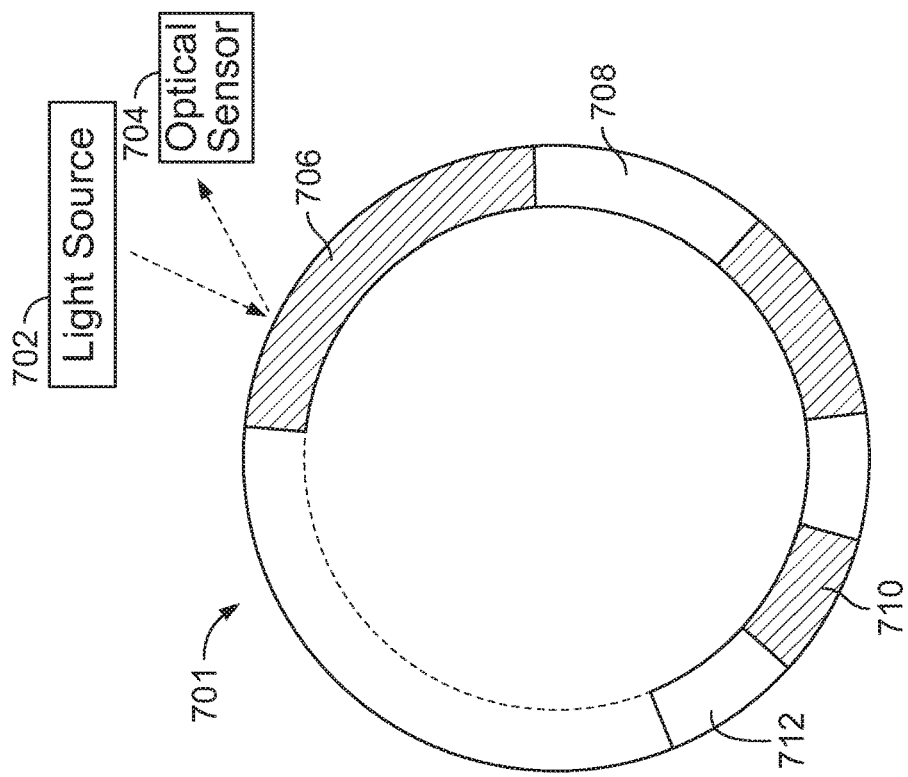
FIGS. 6-8 illustrate alternative example tone rings that may be implemented in the examples disclosed herein.
Figure 6:
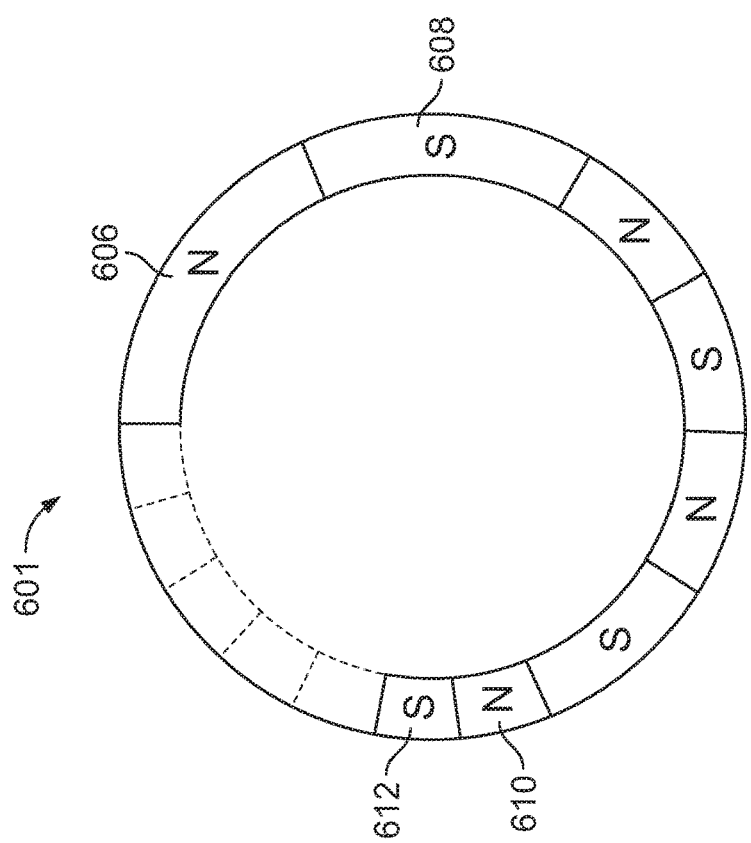
Figure 8:
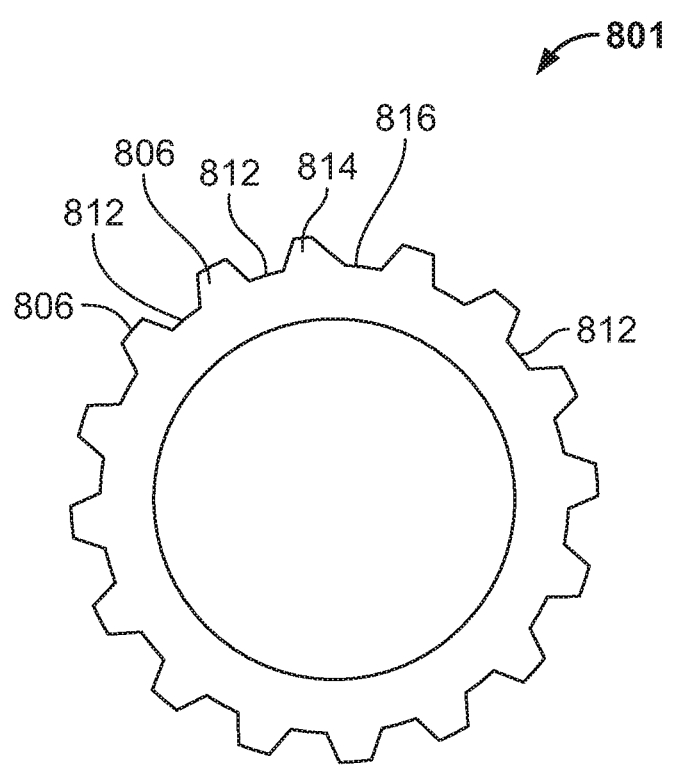

FIGS. 6-8 illustrate alternative example tone rings that may be implemented in the examples disclosed herein. Turning to FIG. 6, a tone ring 601 is shown. In this example, the tone ring 601 includes magnets 606, 608, 610, 612, which are arranged as pairs of magnets such that the polarities of adjacent magnets are alternating in a similar manner to the tone ring 301 described above in connection with FIGS. 3-5D.

To indicate a wheel rotation direction, the tone ring 601 includes magnets with varying lengths along a circumference of the tone ring 601, thereby causing a respective Hall Effect sensor to detect the different magnets and/or magnet pairs with different pulse durations (e.g., different corresponding pulse widths). In particular, a first magnet pair including the magnets 606, 608 has larger circumferential lengths than a second magnet pair including the magnets 610, 612. In this example, the lengths of magnet pairs decrease (e.g., gradually decrease) along the circumference of the tone ring 601 until the shortest magnet pairs are adjacent the longest magnet pair, which is the first magnet pair in this example. As a result, a signal measured at and/or a signal characteristic determined from the Hall Effect sensor has either increasing pulse widths or decreasing pulse widths depending on a direction of rotation of the tone ring 601, thereby enabling determination of the direction of the rotation.

FIG. 7 illustrates another example tone ring 701 in which a light source 702 is used to illuminate a varying circumference of light/color patterns that are detected by an optical sensor 704 of an optical detection system instead of varying magnet circumferences/lengths, as shown in FIG. 6. The ring tone 701 of the illustrated example includes a first light pair (e.g., a first striping pair) that includes a dark segment 706 and a light colored segment 708. The ring tone 701 also includes a second light pair including a dark segment 710 and a light segment 712.

In operation, the optical sensor 704 measures light from the light source 702 that is reflected from the light/color patterns of the tone ring 701. In particular, the optical sensor 704 measures light colored segments when the reflected light detected at the optical sensor 704 exceeds a threshold. Additionally or alternatively, the optical sensor 704 measures the reflected light from the dark colored bands when a respective threshold (e.g., a threshold corresponding to the dark color bands) is passed (e.g., exceeded or below). Regardless of whether the light or dark color bands are detected, varying pulse widths and/or a pulse signal train is defined based on the detection of the reflected light at the optical sensor 704. In a similar manner to the tone ring 601, the varying pulse widths detected by the optical sensor 704 are used to determine a direction of rotation of the tone ring 701 and a corresponding wheel to which the tone ring 701 is coupled.

FIG. 8 illustrates an example toothed tone ring 801, for which a corresponding Hall Effect sensor measures tooth width and/or gaps between the teeth to determine a rotational speed as well as a rotational direction of the tone ring 801. In this example, the tone ring 801 includes a regular pattern of teeth 806 that are separated by gaps 812. In this example, the teeth 806 have the same geometry and are spaced apart at the same intervals via the gaps 812. The tone ring 801 also includes at least one asymmetric tooth 814, which defines a gap 816 that is different from the gaps 812. In this example, a corresponding sensor detects a signal irregularity caused by the asymmetric tooth 814 and/or the gap 816 to determine a direction of rotation of the tone ring 801. In other words, a signal (e.g., a pulse width and/or other resulting waveform geometry) varies based on rotational direction as the sensor detects at least one of the asymmetric tooth 814 or the gap 816. For example, a detected signal/waveform from the tone ring 801 may vary significantly as the asymmetric tooth 814 or the gap 816 passes the Hall Effect sensor based on a resultant signal that varies with rotational direction of the tone ring 801.

In some examples, the tone ring 801 includes a pattern of magnets and/or magnet pairs along a peripheral edge of the tone ring 801. Alternatively, in some examples, the tone ring 801 does not include magnets and/or magnet pairs. In such examples, the teeth 806 and/or the asymmetric tooth 814 pass between a magnet and a rotation sensor (e.g., a Hall Effect sensor) as the tone ring 801 rotates, thereby varying a magnetic field between the sensor and the rotation sensor to indicate a rotational speed and direction of the tone ring 701 and a respective wheel coupled thereto.

In some examples, the tone ring 801 may include multiple asymmetric teeth and/or varying gaps/pitch(es) between the teeth 806. In some examples, the asymmetric tooth 814 is defined by gaps on both sides of the asymmetric tooth 814 that have a different gap size from the gaps 812. In some examples, the gaps on both sides of the asymmetric tooth 814 may be different from one another as well as the gaps 812.

Figure 9:
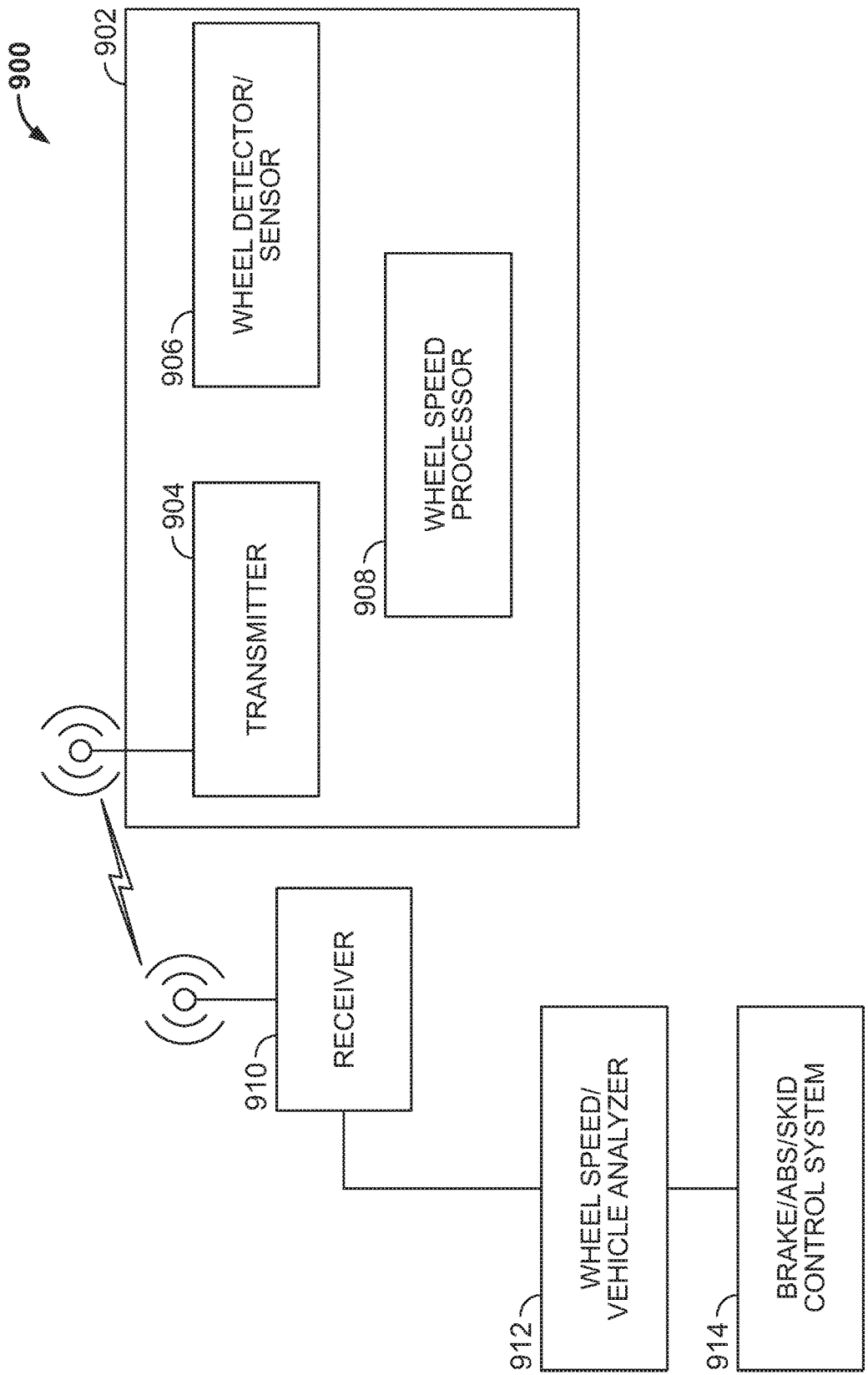
FIG. 9 illustrates an example wheel detection analysis system that may be used to implement the examples disclosed herein.

FIG. 9 illustrates an example wheel analysis system 900 that may be used to implement the examples disclosed herein. The example wheel analysis system 900 includes a wheel detection system 902, which is located in or proximate a wheel/wheel well. The wheel detection system 902 includes a transmitter (e.g. a wireless transmitter) 904, a wheel detector/sensor 906 and a wheel speed processor 908. The example wheel analysis system 900 also includes a receiver 910, a wheel speed/vehicle analyzer 912 and a brake/ABS/skid control system 914, all of which may be located within or proximate an engine compartment.

In operation, the wheel detector/sensor 906 determines wheel rotation information that includes both a wheel rotation direction as well as a rotational speed. For example, the wheel detector/sensor 906 may detect and/or produce a waveform based on magnet pairs of a tone ring such as the tone ring 301. In some examples, the wheel speed processor 908 determines and/or calculates a rotational speed and/or rotational direction based on the detected waveform. The transmitter 904 of the illustrated example transmits the calculated rotational speed and/or rotational direction (e.g., as a waveform or digital value, wheel rotation information) to the receiver 910, which is located within or proximate an engine compartment. In turn, the receiver 910 of the illustrated example transmits the calculated rotational speed and/or the rotational direction to the wheel speed/vehicle analyzer 912 which, in turn, may determine a condition of the vehicle and/or a condition of one or more wheels (e.g., a vehicle skid or brake lock situation, etc.) of the vehicle. In some examples, the wheel speed/vehicle analyzer 912 controls an automated parking system based on the calculated rotational speed and/or the rotational direction. In some examples, a brake/ABS/skid control system 914 utilizes the calculated rotational speed and/or the rotational direction to control an ABS or skid control system (e.g., to pulse brakes, recover a tire from slipping, etc.).

While an example manner of implementing the example wheel analysis system of FIG. 9 is illustrated in FIG. 9, one or more of the elements, processes and/or devices illustrated in FIG. 9 may be combined, divided, re-arranged, omitted, eliminated and/or implemented in any other way. Further, the example transmitter 904, the example wheel speed detector 906, the example wheel speed processor 908, the example receiver 910, the example wheel speed/vehicle analyzer 912, the example brake/ABS/skid control system 914 and/or, more generally, the example wheel analysis system 900 of FIG. 9 may be implemented by hardware, software, firmware and/or any combination of hardware, software and/or firmware. Thus, for example, any of the example the example transmitter 904, the example wheel speed detector 906, the example wheel speed processor 908, the example receiver 910, the example wheel speed/vehicle analyzer 912, the example brake/ABS/skid control system 914 and/or, more generally, the example wheel analysis system 900 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example transmitter 904, the example wheel speed detector 906, the example wheel speed processor 908, the example receiver 910, the example wheel speed/vehicle analyzer 912, and/or the example brake/ABS/skid control system 914 is/are hereby expressly defined to include a tangible computer readable storage device or storage disk such as a memory, a digital versatile disk (DVD), a compact disk (CD), a Blu-ray disk, etc. storing the software and/or firmware. Further still, the example wheel analysis system 900 of FIG. 9 may include one or more elements, processes and/or devices in addition to, or instead of, those illustrated in FIG. 9, and/or may include more than one of any or all of the illustrated elements, processes and devices.

Figure 10:
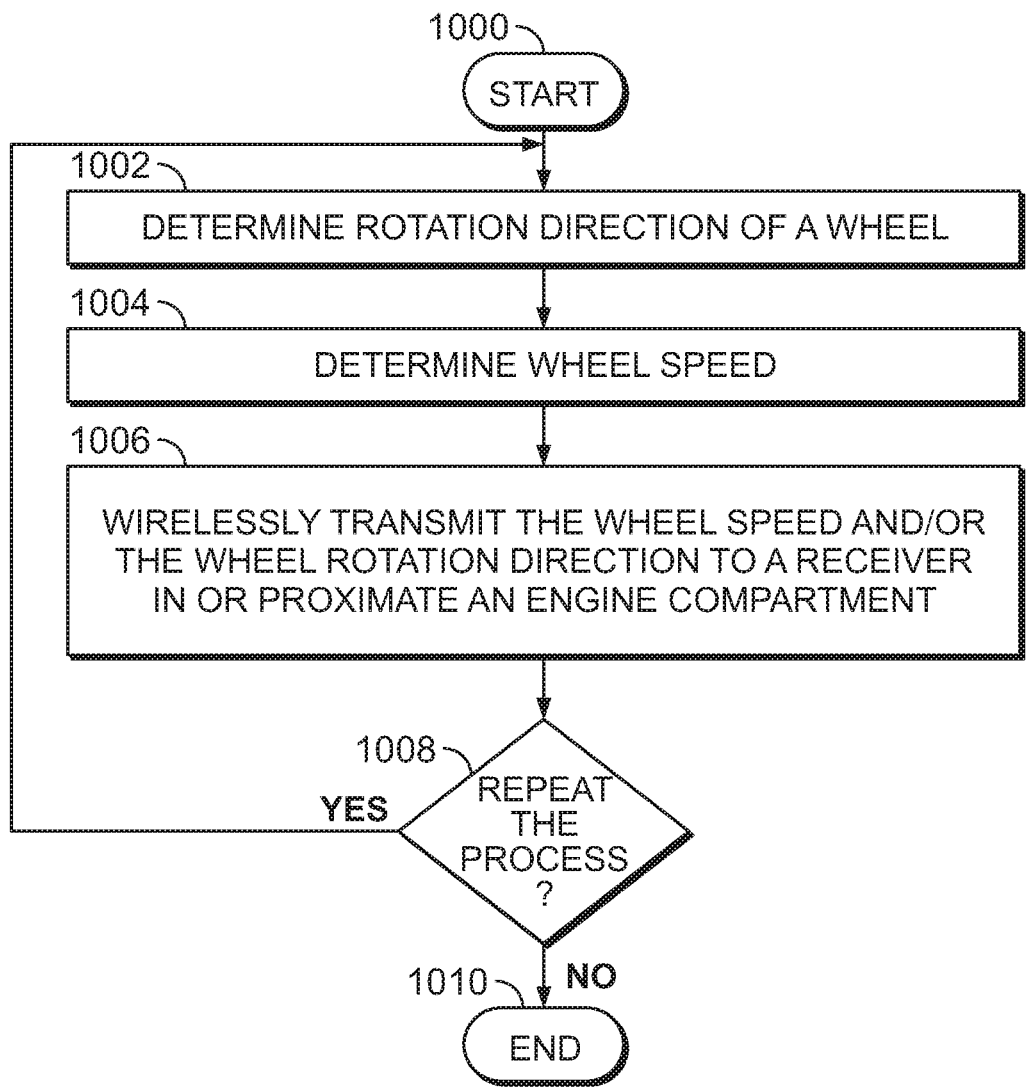
FIG. 10 is a flowchart representative of an example method that may be used to implement the example wheel detection analysis system of FIG. 9.

A flowchart representative of an example method for implementing the wheel analysis system 900 of FIG. 9 is shown in FIG. 10. The example method may be implemented by machine readable instructions that comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example wheel analysis system 900 of FIG. 9 may alternatively be used. For example, the order of execution of the blocks may be changed, and/or some of the blocks described may be changed, eliminated, or combined.

As mentioned above, the example method of FIG. 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 10 begins at block 1000 where a vehicle (e.g., the vehicle 100) is being driven. In this example, wheel assemblies of the vehicle are being monitored so that an ABS system of the vehicle may control brakes, as needed, to keep the vehicle from skidding, for example.

A rotation direction of a wheel is determined (block 1002). In particular, a sensor such as the rotation sensor 302 is used to determine a wheel rotation direction of a respective wheel to which the sensor is proximate. For example, a wheel speed processor such as the wheel speed processor 908 may determine wheel rotation direction based on pulsed waveforms and/or variance of the pulse waveforms due to a non-axisymmetric geometry of a tone ring.

In some examples, a wheel speed is also determined/measured (block 1004). In this example, the wheel speed processor uses a periodicity of pulses corresponding to waveforms and/or a pattern of waveforms to determine the wheel speed. In some examples, wheel speeds of different wheels are compared to determine if the vehicle is skidding, for example.

In this example, the wheel speed and/or the wheel rotation direction is transmitted to a receiver proximate and/or disposed within an engine compartment of the vehicle (block 1006). In this example, a transmitter such as the transmitter 304 or the transmitter 904 is used to transmit wheel rotation information/data, which may include both the wheel rotation direction as well as the wheel speed to a receiver (e.g., the receiver 910). In some examples, the wheel information/data from multiple wheels is received analyzed by a wheel speed processor such as the wheel speed processor 908 to determine whether one or more wheels are slipping/skidding. In some examples, additionally or alternatively the wheel information/data is used to determine a condition and/or driving condition of the vehicle.

Next, it is determined whether to repeat the process (block 1008). If the process is to be repeated (block 1008), control of the process returns to block 1002. Otherwise, if the process is not to be repeated, the process end (block 1010).

Figure 11:
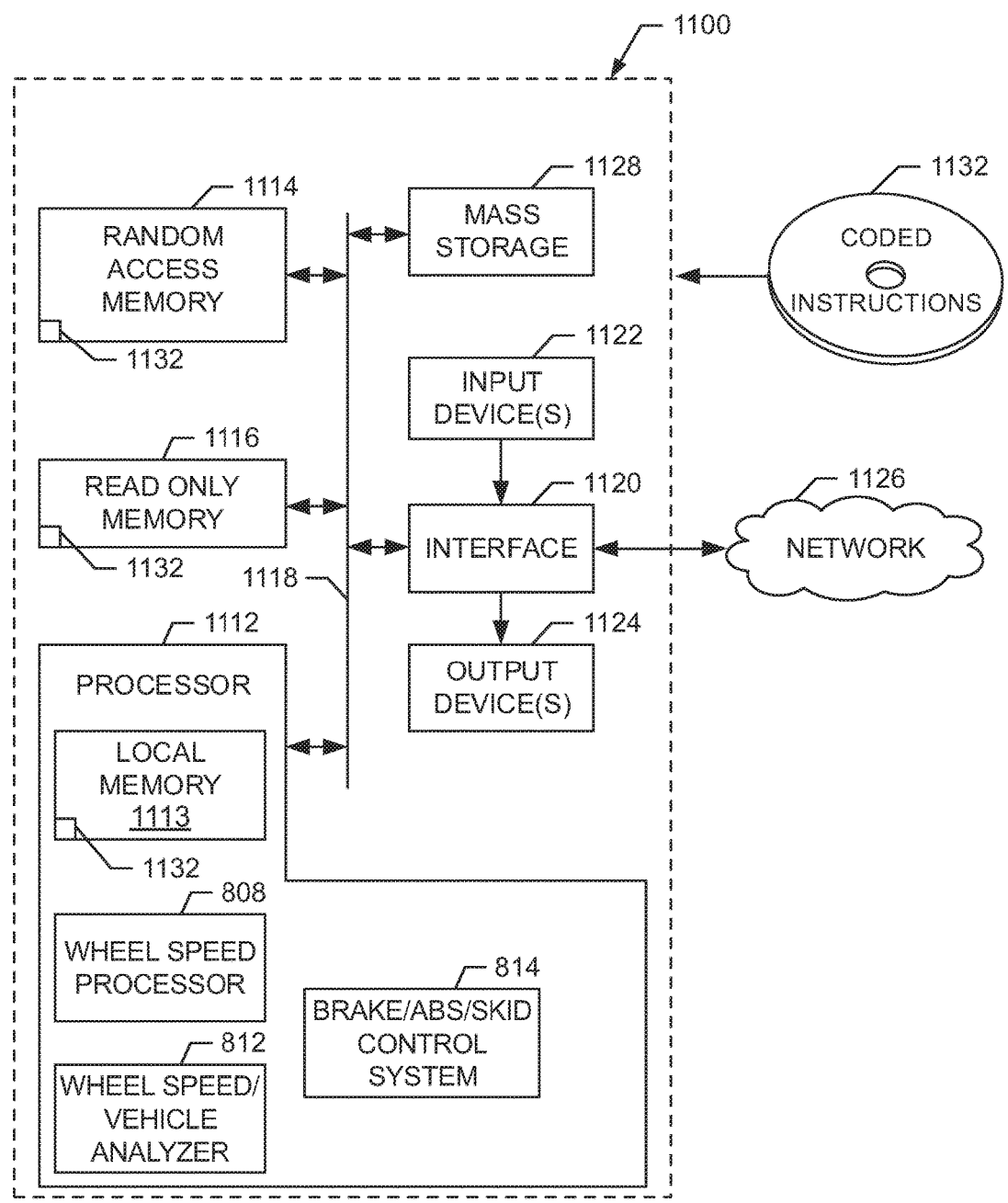
FIG. 11 is a block diagram of an example processor platform capable of executing machine readable instructions to implement the example method of FIG. 10.

FIG. 11 is a block diagram of an example processor platform 1100 capable of executing the instructions of FIG. 10 to implement the wheel analysis system 900 of FIG. 9. The processor platform 1100 can be, for example, a server, a personal computer, a mobile device (e.g., a cell phone, a smart phone, a tablet such as an iPad™), a personal digital assistant (PDA), an Internet appliance, a digital video recorder, a Blu-ray player, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 of FIG. 9 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed examples enable wheel rotation direction and/or wheel speed to be detected and transmitted wirelessly, thereby avoiding complexities and/or costs of sealing a cable and/or associated connectors from a wheel well to an engine compartment, for example. The disclosed examples enable an electronic control unit to determine wheel rotation direction for brake controls (e.g., for skidding) and/or automated applications such as automated parking, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a tone ring exhibiting a rotational asymmetry, wherein the tone ring includes a plurality of teeth, the plurality of teeth including an asymmetric tooth with a first gap to a first adjacent tooth on a first side and a second gap to a second adjacent tooth on a second side, the second gap different from the first gap to at least partially define the rotational asymmetry of the tone ring, wherein each of the teeth has the same outer radius extending from a center of the tone ring, wherein the asymmetry of the tooth is defined by first and second ramped surfaces on the first and second sides, respectively, the first and second ramped surfaces having different angles relative to a periphery of the tone ring;

a detector to determine a rotational direction of a wheel of a vehicle based on a difference in measured signals between first and second rotational directions of the wheel, the difference in measured signals caused by the rotational asymmetry, and to measure a rotational speed of the wheel, the detector or the tone ring operatively coupled to the wheel, wherein the detector includes a magnetic field sensor; and a wireless transmitter to transmit the rotational direction and the rotational speed to a receiver proximate or within an engine compartment of the vehicle.

2. The apparatus as defined in claim 1, wherein the wireless transmitter includes a radio frequency identification device (RFID) transmitter.

3. The apparatus as defined in claim 1, wherein the detector includes an optical sensor.

4. The apparatus as defined in claim 1, wherein the detector and the transmitter are contained within the same housing.

5. The apparatus as defined in claim 1, wherein the rotational direction and the rotational speed are multiplexed within a common signal.

6. A method comprising:

determining wheel rotation information including speed and rotation direction of a wheel of a vehicle based on a rotational asymmetry of a tone ring coupled to or proximate the wheel, wherein the tone ring includes a plurality of teeth, the plurality of teeth including an asymmetric tooth with a first gap to a first adjacent tooth on a first side and a second gap to a second adjacent tooth on a second side, the second gap different from the first gap to at least partially define the rotational asymmetry of the tone ring, each of the teeth has the same outer radius extending from a center of the tone ring, wherein the rotation direction is determined based on a difference in measured signals between first and second rotational directions of the wheel, the difference in measured signals caused by the rotational asymmetry, wherein the asymmetry of the tooth is defined by first and second ramped surfaces on the first and second sides, respectively, the first and second ramped surfaces having different angles relative to a periphery of the tone ring, and wherein the speed and rotation direction are determined based on pulse data; and wirelessly transmitting the wheel rotation information from a transmitter proximate the wheel to a receiver disposed within or proximate an engine compartment of the vehicle.

7. The method as defined in claim 6, wherein wirelessly transmitting the wheel rotation information includes transmitting the wheel rotation information via a radio frequency identification device (RFID) interface.

8. The method as defined in claim 6, wherein the tone ring includes an arrangement of magnets positioned along a peripheral edge of the tone ring.

9. An apparatus comprising:

a transmitter proximate a wheel of a vehicle, the transmitter to measure or receive wheel rotation information, wherein the wheel rotation information indicates speed and rotation direction of the wheel, wherein the transmitter is to receive a pulse waveform based on a tone ring exhibiting a rotational asymmetry about a rotational axis of the tone ring, and wherein the tone ring includes a plurality of teeth, the plurality of teeth including an asymmetric tooth with a first gap to a first adjacent tooth on a first side and a second gap to a second adjacent tooth on a second side, the second gap different from the first gap to define the rotational asymmetry of the tone ring, each of the teeth has the same outer radius extending from a center of the tone ring, wherein the rotation direction is determined based on a difference in measured signals between first and second rotational directions of the wheel, the difference in measured signals caused by the rotational asymmetry, wherein the asymmetry of the tooth is defined by first and second ramped surfaces on the first and second sides, respectively, the first and second ramped surfaces having different angles relative to a periphery of the tone ring, and wherein the transmitter is to calculate the wheel rotation information based on signals received from a sensor proximate a wheel of the vehicle; and a receiver disposed within an engine compartment of the vehicle to wirelessly receive the wheel rotation information.

10. The apparatus as defined in claim 9, wherein the wheel rotation information includes pulse waveforms that vary during each rotational cycle of the wheel based on the rotation direction of the wheel.

11. The apparatus as defined in claim 9, wherein the rotational asymmetry is further defined by varying pitches of teeth across a peripheral edge of the tone ring.

12. The apparatus as defined in claim 9, wherein the sensor includes an optical sensor.

* * * * *